Patented Jan. 26, 1932

1,842,989

UNITED STATES PATENT OFFICE

WALTER KROPP, OF ELBERFELD, AND LEO ROSENTHAL, OF VOHWINKEL, GERMANY, ASSIGNORS TO I. G. FARBENINDUSTRIE AKTIENGESELLSCHAFT, OF FRANKFORT-ON-THE-MAIN, GERMANY

MEDIUMS FOR INHIBITING THE PERISHING OF ARTIFICIAL AND NATURAL VARIETIES OF RUBBER

No Drawing. Application filed August 14, 1929, Serial No. 385,977, and in Germany September 9, 1928.

The present invention relates to media for inhibiting or reducing the perishing of artificial and natural varieties of rubber.

We have found that indane phenols of the probable general formula

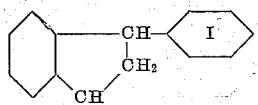

wherein the nucleus I is substituted by at least one hydroxy group and may be further substituted by alkyl-groups, such as $CH_3$, $C_2H_5$ and the like, are valuable media for inhibiting or reducing the perishing of artificial and natural varieties of rubber. The incorporation of our antiperishing agents within the rubber may be performed in any desired manner before vulcanization, for instance, by rolling or kneading. By this addition the unvulcanized as well as the vulcanized products are protected completely or at least to a far reaching degree against perishing due to age.

The indane phenols may be prepared, for instance, by reacting with a phenolic compound, such as phenol, cresols, resorcen and the like, upon indene in the presence of a hydrohalic acid or a suitable metal chloride according to our U. S. Patent No. 1,754,052, patented April 8, 1930, application Serial No. 200,761, filed June 22, 1927, or as described by Ch. Courtot in Comptes Rendus 1928, page 661.

Salts of the indane phenols or the crude products obtainable in the manufacture of the indane phenols may be used without departing from our invention.

In sunlight vulcanization products of rubber mixtures containing the said products show no discoloration. Hence, the indane phenols can be used for light or colored qualities in contradistinction to most of the known anti-perishing agents. Furthermore, the products are particularly valuable because they are poisonous only to a very slight extent. The indane phenols do not act as accelerators in the vulcanization. They are almost insoluble in water with the result that they can be used in vulcanization processes in which open steam is employed. They are added to the rubber mixtures advantageously in quantities of about 1–5% by weight of the rubber variety applied.

The invention is illustrated by the following example, without being restricted thereto:—

A mixture of 100 parts by weight of smoked sheets, 36 parts by weight of carbon black, 28 parts of weight of zinc white, 1 part by weight of diphenylguanidine, 4 parts by weight of sulfur and 2.2 parts by weight of resorcyl indane are heated for 40 minutes to about 140–150° C.

The vulcanization products thus obtained possesses the following tensile strengths:—

|  | Strength kg./sq. cm. | Stretch per cent |
|---|---|---|
| Unperished | 199 | 594 |
| After artificial perishing | 207 | 530 |

According to the usual methods, for instance, by heating the vulcanizate in the so called Geer oven to about 70° C. for a time corresponding to a natural perishing of about 5 years.

The same charge without resorcyl indane gave after equal heating the following figures:—

|  | Strength kg./sq. cm. | Stretch per cent |
|---|---|---|
| Unperished | 240 | 560 |
| After artificial perishing (as mentioned above) | 145 | 365 |

When in the above mixture indane phenol is used instead of resorcyl indane and vulcanization is performed by heating the mixture to 140 to 150° C. for 55 minutes a vulcanizate is obtained which possesses the following strength:

|   | Strength kg./sq. cm. | Stretch per cent |
|---|---|---|
| Unperished | 224 | 580 |
| After artificial perishing (as mentioned above) | 220 | 506 |

Without the protective agent the same charge gave the following figures:—

|   | Strength kg./sq. cm. | Stretch per cent |
|---|---|---|
| Unperished | 233 | 520 |
| After artificial perishing (as mentioned above) | 107 | 270 |

Instead of the indane phenol there can be used, for example, the hexamethylenetetramine compound thereof or other indane phenols, such as indanyl cresol. The products can likewise be applied in admixture with already known anti-perishing agents.

We claim:—

1. Artificial and natural varieties of rubber having incorporated therewith a compound of the probable formula

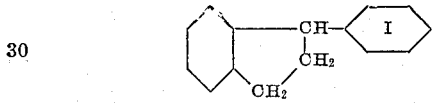

wherein the nucleus marked I is substituted by at least one hydroxy group and may be further substituted by alkyl groups, said rubber composition being protected against perishing.

2. Artificial and natural varieties of rubber having incorporated therewith a compound of the probable formula

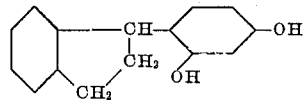

said rubber compositions being protected against perishing.

3. Artificial and natural varieties of rubber having incorporated therewith about 1-5% by weight, calculated on the rubber variety applied, of a compound of the probable formula

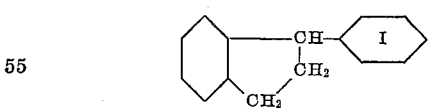

wherein the nucleus marked I is substituted by at least one hydroxy group and may be further substituted by alkyl groups, said rubber composition being protected against perishing.

4. Artificial and natural varieties of rubber having incorporated therewith about 1-5% by weight, calculated on the rubber variety applied, of a compound of the probable formula

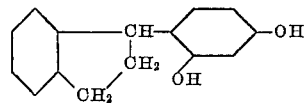

said rubber compositions being protected against perishing.

5. The process of preventing artificial and natural varieties of rubber from perishing which comprises incorporating therewith as an antiperishing agent a compound of the probable formula:

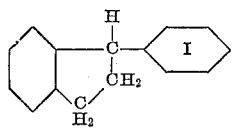

wherein the nucleus marked I is substituted by at least one hydroxy group and may be further substituted by alkyl groups.

6. The process of preventing artificial and natural varieties of rubber from perishing which comprises incorporating therewith as an antiperishing agent a compound of the probable formula:

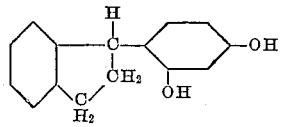

7. The process of preventing artificial and natural varieties of rubber from perishing which comprises incorporating therewith about 1 to 5% of a compound of the probable formula:

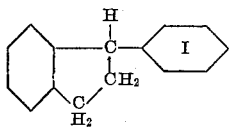

wherein the nucleus marked I is substituted by at least one hydroxy group and may be further substituted by alkyl groups.

In testimony whereof we have hereunto set our hands.

WALTER KROPP. [L. S.]
LEO ROSENTHAL. [L. S.]